(12) United States Patent
Baumgartner et al.

(10) Patent No.: US 9,970,766 B2
(45) Date of Patent: May 15, 2018

(54) PLATFORM-MOUNTED ARTIFICIAL VISION SYSTEM

(71) Applicants: Dustin D. Baumgartner, Ellicott, MD (US); Bruce J. Schachter, Clarksville, MD (US); Kathryn B. Stewart, Ellicott City, MD (US); Michael M. Becker, Columbia, MD (US)

(72) Inventors: Dustin D. Baumgartner, Ellicott, MD (US); Bruce J. Schachter, Clarksville, MD (US); Kathryn B. Stewart, Ellicott City, MD (US); Michael M. Becker, Columbia, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1047 days.

(21) Appl. No.: 14/041,849

(22) Filed: Sep. 30, 2013

(65) Prior Publication Data
US 2016/0219245 A1    Jul. 28, 2016

(51) Int. Cl.
*G06K 9/00* (2006.01)
*G01C 21/16* (2006.01)
(Continued)

(52) U.S. Cl.
CPC ........... *G01C 21/165* (2013.01); *G01C 23/00* (2013.01); *G06T 5/003* (2013.01); *G06T 5/50* (2013.01); *H04N 5/144* (2013.01); *H04N 5/23229* (2013.01); *H04N 5/23258* (2013.01); *H04N 5/23267* (2013.01); *H04N 5/23293* (2013.01); *H04N 5/33* (2013.01);
(Continued)

(58) Field of Classification Search
CPC . G06F 3/04842; G06T 19/006; G06T 7/0024; G06T 7/2046; G06K 9/6232; G06K 9/3241; H04N 5/33; H04N 7/181
See application file for complete search history.

(56) References Cited

U.S. PATENT DOCUMENTS 6,061,068 A * 5/2000 Hoffman, II ............ G06T 15/00
345/619
6,330,356 B1 * 12/2001 Sundareswaran ......... G06T 3/00
345/648

(Continued)

OTHER PUBLICATIONS

Klein, et al.: "Use of 3D Conformal Symbology on HMD for a Safer Flight in Degraded Visual Environment"; pp. 1-10.

*Primary Examiner* — Vu Le
*Assistant Examiner* — Guillermo Rivera-Martinez
(74) *Attorney, Agent, or Firm* — Tarolli, Sundheim, Covell & Tummino LLP (57) ABSTRACT

One embodiment includes an artificial vision system mounted on a platform. The system includes an image system comprising a video source that is configured to capture a plurality of sequential images. The image system also includes an image processing system configured, via at least one processor, to process the plurality of sequential images to calculate situational awareness (SA) data with respect to each of the plurality of sequential images and to convert the processed plurality of sequential images to visible images. The system further includes a video display system configured to display the visible images associated with the processed plurality of sequential images and to visibly identify the SA data relative to the platform.

14 Claims, 3 Drawing Sheets

(51) Int. Cl.
  *H04N 5/33* (2006.01)
  *H04N 5/232* (2006.01)
  *G01C 23/00* (2006.01)
  *H04N 5/14* (2006.01)
  *G06T 5/00* (2006.01)
  *G06T 5/50* (2006.01)
  *H04N 5/76* (2006.01)

(52) U.S. Cl.
  CPC ............... *G06T 2207/10028* (2013.01); *G06T 2207/10048* (2013.01); *G06T 2207/20201* (2013.01); *G06T 2207/30261* (2013.01); *H04N 5/76* (2013.01)

(56) References Cited

U.S. PATENT DOCUMENTS

| | | | |
|---|---|---|---|
| 8,019,490 B2 | 9/2011 | Ferren et al. | |
| 8,023,760 B1 | 9/2011 | Buck et al. | |
| 8,149,245 B1 | 4/2012 | Buck et al. | |
| 2004/0083038 A1* | 4/2004 | He | G06T 15/04 701/3 |
| 2004/0169663 A1* | 9/2004 | Bernier | G06T 15/10 345/629 |
| 2007/0279755 A1* | 12/2007 | Hitschmann | G02B 27/0101 359/630 |
| 2008/0205791 A1* | 8/2008 | Ideses | H04N 19/597 382/285 |
| 2009/0212994 A1* | 8/2009 | Hamza | G01S 13/723 342/107 |
| 2010/0231705 A1* | 9/2010 | Yahav | G02B 27/01 348/115 |
| 2012/0044476 A1* | 2/2012 | Earhart | G01S 3/7867 356/4.01 |
| 2012/0249827 A1 | 10/2012 | Wootton et al. | |

* cited by examiner

PLATFORM-MOUNTED ARTIFICIAL VISION SYSTEM

This invention was made with Government support under Contract No. W31P4Q-09-C-0539. The Government has certain rights in this invention.

TECHNICAL FIELD

The present invention relates generally to artificial vision systems, and specifically to a platform-mounted artificial vision system.

BACKGROUND

Artificial vision systems can be implemented for a variety of reasons. As an example, an artificial vision system can be mounted on a stationary platform and can be implemented for security measures. As another example, an artificial vision system can be mounted on a moving platform (e.g., an aircraft), such as to assist a pilot in navigation of the moving platform. As an example, both military and commercial rotorcraft survivability is significantly impacted while operating in a degraded visual environment (DVE). Common degraded visual conditions affecting rotorcraft, for example, include brownout (sand in atmosphere), whiteout (snow in atmosphere), smoke, rain, mist, fog, turbulence, darkness, and helicopter rotor blade obstruction. Such degraded visual conditions can result in a crash of the moving platform as the pilot's vision is obscured by the degraded visual condition. As an example, landing a helicopter in brownout conditions can be particularly perilous.

SUMMARY

One embodiment includes an artificial vision system mounted on a platform. The system includes an image system comprising a video source that is configured to capture a plurality of sequential images. The image system also includes an image processing system configured, via at least one processor, to process the plurality of sequential images to calculate situational awareness (SA) data with respect to each of the plurality of sequential images and to convert the processed plurality of sequential images to visible images. The system further includes a video display system configured to display the visible images associated with the processed plurality of sequential images and to visibly identify the SA data relative to the platform.

Another embodiment includes a non-transitory computer readable medium configured to store instructions that, when executed by a processor, are configured to implement a method for providing artificial vision assistance for navigating a moving platform. The method includes capturing a plurality of sequential frames of infrared (IR) image data via an IR video source mounted on the moving platform and calculating SA data associated with each of the plurality of sequential frames relative to the moving platform. The method also includes converting the plurality of sequential frames to visible images and displaying the visible images on a video display system to assist in navigation of the moving platform. The method further includes identifying the SA data relative to the moving platform on the visible images.

Another embodiment includes an artificial vision system mounted on a moving platform. The system includes a self-enclosed image system. The self-enclosed image system includes an infrared IR video source that is configured to capture a plurality of sequential frames of IR image data and an inertial measurement unit configured to generate inertial data associated with the moving platform. The self-enclosed image system further includes an image processing system configured via at least one processor and based on the inertial data to stabilize the plurality of sequential frames, to calculate SA data with respect to each of the plurality of sequential frames, to enhance the plurality of sequential images with respect to environment-based occlusion of the video source based on recursively processing consecutive stabilized images of the plurality of sequential frames, and to convert the plurality of sequential frames into visible images. The system further includes a video display system configured to display the visible images and to visibly identify the SA data relative to the moving platform.

DETAILED DESCRIPTION

The present invention relates generally to artificial vision systems, and specifically to a platform-mounted artificial vision system. The artificial vision system can be mounted, for example, on a moving platform, such as an aircraft (e.g., helicopter). The artificial vision system includes an image system, which can be a self-contained image system (e.g., image system package). The image system includes a video source, which can be configured as a forward-looking infrared (FLIR) video source, that is configured to captures a plurality of sequential frames of image data. As described herein, the term "artificial vision system" refers to a vision system that provides processed video images of a scene that can be viewed by a user in lieu of or in addition to the user's own vision. The image system also includes one or more processors configured as an image processing system. The image processing system is configured to process the sequential frames with minimum lag, such as to provide stabilization of the sequential frames and/or to calculate situational awareness (SA) data associated with the sequential frames relative to the platform. The image processing system can also be configured to provide lucky region image processing, such as to enhance the sequential frames with respect to environment-based occlusion of the video source, such as based on a degraded visual environment (DVE), based on recursively processing consecutive stabilized images of the sequential frames. The enhancement can be based on inertial data associated with the platform (i.e., a moving platform), such as generated by an inertial measurement unit (IMU) that is included within the self-contained image system. The image system can also convert the sequential frames to visible images, such that the visible images can be displayed on a video display system, such as to assist a pilot in navigation of the platform (i.e., moving platform).

As an example, the image processing system can include a synthetic vision SA component configured to generate the SA data. For example, the synthetic SA component can be configured to calculate three-dimensional locations of objects relative to the platform based on parallax associated with consecutive stabilized images of the plurality of sequential frames based on the inertial data of the moving platform. The image system can thus identify the SA data on the visible images, such as by highlighting the objects on the visible images, to further assist the pilot in navigating the platform, such as during take-off and landing maneuvers. As another example, the image processing system can include a lucky region imaging component that can provide the enhancement to the sequential frames with respect to environment-based occlusion of the video source. As an example, the lucky region imaging component can assign a weight to each pixel associated with a current one of the sequential frames based on the inertial data and on a selected mean image latency. The lucky region imaging component can then apply a recursive imaging algorithm on the sequential frames based on the weight assigned to each pixel of the current one of the sequential frames relative to an immediately preceding previously processed one of the sequential frames to enhance the plurality of sequential frames.

Figure 1:
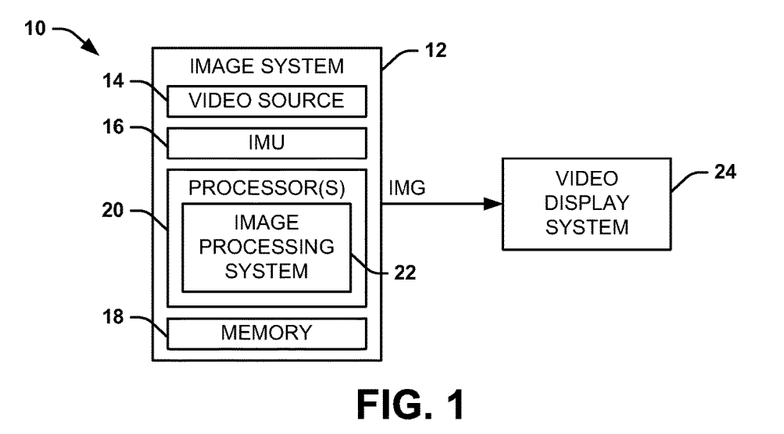
FIG. 1 illustrates an example of an artificial vision system.

FIG. 1 illustrates an example of an artificial vision system 10. The artificial vision system 10 can be mounted on a platform. As an example, the platform can be a stationary platform, such that the artificial vision system 10 can be implemented for security purposes. As another example, the artificial vision system 10 can be mounted on a moving platform, such as an aircraft (e.g., a helicopter), to assist an associated pilot in navigation of the moving platform, such as in a degraded visual environment (DVE), such as for the purpose of landing the aircraft.

The artificial vision system 10 includes an image system 12 that can be configured as a self-contained package. In the example of FIG. 1, the image system 12 includes a video source 14 that is configured to capture a plurality of sequential frames of an environment scene. For example, the video source 14 can be configured as a forward-looking infrared (IR) video source, such that the sequential IR images are sequential frames. As an example, the image system 12 can be mounted on at least one location of the moving platform, such as on a nose of a helicopter, such that the video source 14 captures the sequential frames from approximately the same perspective as the pilot of the moving platform. In the example of the artificial vision system 10 being located on a moving platform, the image system 12 includes an inertial measurement unit (IMU) 16 that is configured to generate inertial data associated with the sensor within the moving platform, such as movement in six-degrees of motion (e.g., yaw, pitch, roll, and vector motion in three-dimensions). By including the IMU 16 in the image system 12, as opposed to receiving the inertial data from an external source (e.g., a flight computer associated with the moving platform), the inertial data can be more accurate with respect to the image processing of the sequential frames captured by the video source 14, as described in greater detail herein.

The image system 12 also includes a memory 18 and one or more processors 20 that are configured as an image processing system 22. The memory 18 can be configured to store the instructions that implement the image processing system 22 via the processor(s) 20, and can be implemented to buffer one or more sequential frames captured by the video source 14 and the processing thereof. The image processing system 22 is configured to process the sequential frames and to provide the processed sequential frames as visible video data IMG to a video display system 24. As an example, the video display system 24 can be configured as a video monitor that provides visible images to a user to view the environment scene, such as to assist a pilot in navigating the moving platform. As an example, the image processing system 22 can be configured to generate situational awareness (SA) data. For example, the SA data can include three-dimensional locations of objects relative to the platform based on parallax associated with consecutive sequential frames based on the inertial data generated by the IMU 16 of the moving platform. The image processing system 22 can thus modify the visible video data IMG to identify the SA data on the visible images provided by the video display system 24, such as by highlighting the objects on the visible images, to further assist a pilot in navigating the moving platform. As another example, the image processing system 22 can be configured to enhance the sequential frames with respect to environment-based occlusion of the video source. Accordingly, the pilot can use the video display system 24 to assist in safely navigating the moving platform in a DVE, such as during aircraft landing and take-off.

Figure 2:
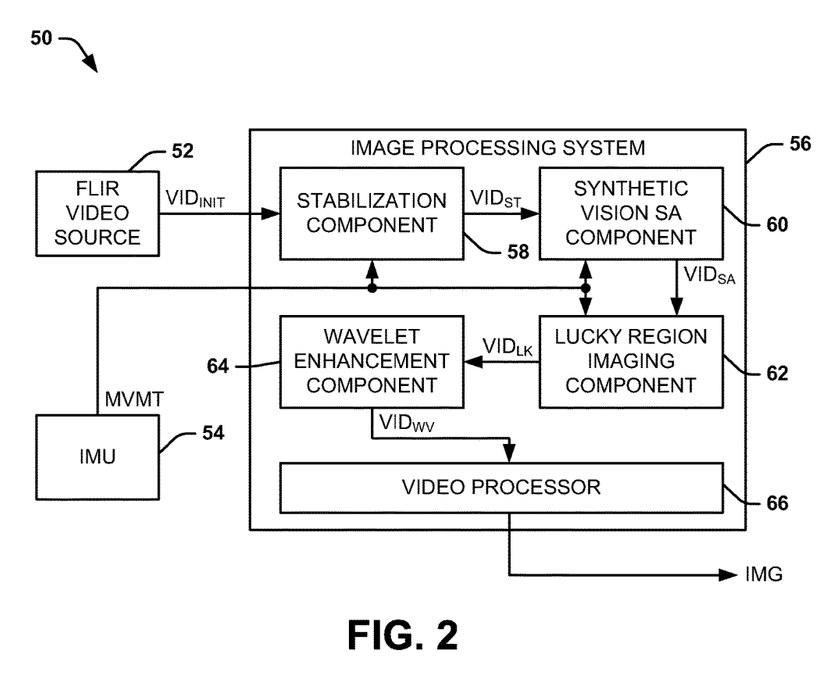
FIG. 2 illustrates an example of an image system.

FIG. 2 illustrates an example of an image system 50. The image system 50 can correspond to the image system 12 in the example of FIG. 1. Therefore, the image system 50 can be implemented as a self-contained unit mounted on a platform, such as a moving platform, to capture sequential frames of an environment scene and provide visible video data IMG to a video display system (e.g., the video display system 24). Thus, the image system 50 can provide artificial vision for a user, such as a pilot of the moving platform.

The image system 50 includes a FLIR video source 52 that is configured to capture a plurality of sequential IR frames of image data of the environment scene. In the example of FIG. 2, the FLIR video source 52 generates image data $VID_{INIT}$ that can correspond to fourteen-bit IR image data provided at sixty frames per second (fps). As an example, the FLIR video source 52 can be configured to implement image pre-processing on the captured IR images, such that the image data $VID_{INIT}$ is pre-processed. For example, the pre-processing of the FLIR video source 52 can include correction of non-uniformity (e.g., based on variability during the fabrication of an associated focal plane array (FPA)) and pixel errors. The image system 50 also includes an IMU 54 that is configured to generate inertial data MVMT associated with motion of the moving platform on which the image system 50 can be mounted (e.g., on one or more locations of a helicopter). The inertial data MVMT generated by the IMU 54 can be associated with movement in six-degrees of motion (e.g., yaw, pitch, roll, and vector motion in three-dimensions) of the FLIR video source 52 based on being included within the self-contained package of the image system 50, such as to provide a more accurate measurement of the movement of the FLIR video source 52 for processing of the image data $VID_{INIT}$.

The image data VIDINT and the inertial data MVMT are each provided to an image processing system 56. The image processing system 56 can be configured as a set of software modules that are executed by one or more processors (e.g., the processor(s) 20 in the example of FIG. 1), such as in a system-on-chip (SOC) arrangement in the self-contained image system 50. In the example of FIG. 2, the image data $VID_{INIT}$ is provided to a stabilization component 58 that is configured to provide video frame stabilization of the image data $VID_{INIT}$ to generate stabilized image data $VID_{ST}$. As an example, the stabilization component 58 can employ a Structure-From-Motion technique to estimate a pose of the FLIR video source 52 for each of the sequential frames of the image data $VID_{INIT}$ based on the inertial data MVMT. Once the stabilization component 58 determines a pose of the FLIR video source 52, two consecutive IR images can be aligned based on a homography corresponding to a projective transformation that can be applied to render an image from a given pose into the perspective of another pose. As an example, the stabilization component 58 can estimate a homography using robust salient features that are detected within each IR image of the image data $VID_{INIT}$. The features are detected on the current IR image and can then be correlated with features detected in the previous image. From this correlation, the homography can be determined to spatially align overlapping pixels in the current IR image to those of the previous IR image. Thus, homography can capture frame-to-frame displacement caused by movement of the platform/FLIR video source 52 and/or gimbals pointing angle inaccuracies. The stabilized image data $VID_{ST}$ can thus include a homography between a current frame and one or more (e.g., two) previous frames.

The stabilized image data $VID_{ST}$ is provided to a synthetic vision SA component 60. The synthetic vision SA component 60 is configured to process the stabilized image data $VID_{ST}$ based on the inertial data MVMT to calculate SA data associated with the sequential frames, such as can be implemented to assist in processing of the image data $VID_{ST}$ and/or to assist in navigation of the moving platform.

Figure 3:
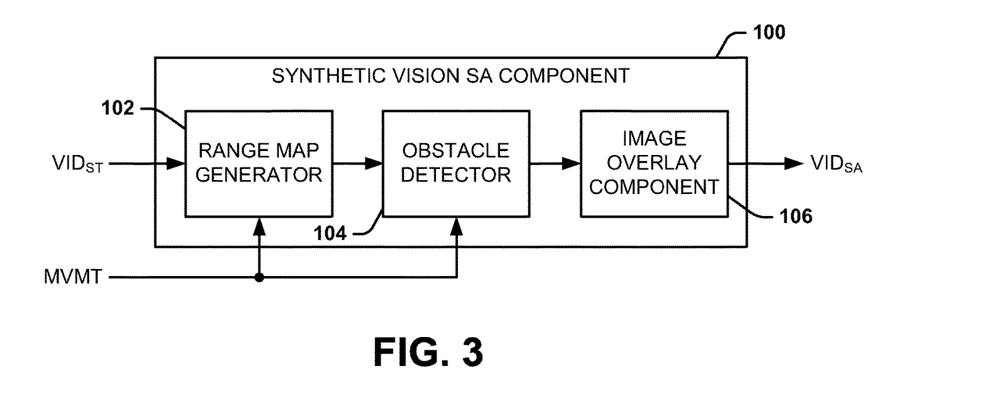
FIG. 3 illustrates an example of a synthetic vision situational awareness component.

FIG. 3 illustrates an example of a synthetic vision SA component 100. The synthetic vision SA component 100 can correspond to the synthetic vision SA component 60 in the example of FIG. 2, and can thus be implemented in the image system 50 to calculate SA data with respect to the FLIR video source 52, and thus the moving platform. The synthetic vision SA component 100 receives the inertial data MVMT and the stabilized image data $VID_{ST}$, which can correspond to the fourteen-bit IR image frames received at sixty fps that includes the pose information of the FLIR video source 52, and outputs image data $VID_{SA}$, which can correspond to the stabilized image data $VID_{ST}$ that includes the SA data. In the example of FIG. 3, the synthetic vision SA component 100 includes a range map generator 102, an obstacle detector 104, and an image overlay component 106.

The range map generator 102 is configured to generate an approximate three-dimensional range map that is constructed using consecutive frames of the stabilized image data $VID_{ST}$ as the moving platform moves. The passive three-dimensional range map can include relative range information to objects in the scene. Based on the three-dimensional range map, the obstacle detector 104 is configured to approximate an actual range to the objects in the three-dimensional range map by comparing an apparent motion of the objects in the three-dimensional range map based on the known motion of the moving platform as provided by the inertial data MVMT over a given amount of time. In this manner, the obstacle detector 104 can determine the location of the obstacles based on parallax associated with consecutive stabilized images of the stabilized image data $VID_{ST}$ based on the inertial data MVMT. Thus, the obstacle detector 104 is configured to determine the three-dimensional location of the obstacles in the three-dimensional range map based on high saliency regions that stand out from their surroundings on the three-dimensional range map. Obstacle locations can be maintained in three-dimensional coordinates even after obstacles are completely obscured, such as during severest brownout conditions.

The image overlay component 106 is configured to extract a distance to detected obstacles from the passive three-dimensional range map and insert distance data into the stabilized image data $VID_{ST}$, such that the stabilized image data $VID_{ST}$ can be annotated with data associated with the obstacles. The image overlay component 106 thus provides the annotated data as SA data $VID_{SA}$, which can include the stabilized image data $VID_{ST}$ that is annotated with the data associated with the obstacles. Accordingly, the image data $VID_{SA}$ can be processed to provide identification of the obstacles as overlays on the visible images displayed on the video display system 24 (e.g., via the visible video data IMG). For example, the obstacles can be highlighted on the displayed visible images separate from a respective background of the displayed visible images, such as based on having different colors, brightness, text overlays (e.g., displaying information), graphical cues, and/or other information. Accordingly, as the platform moves in DVE conditions (e.g., brownout), the highlighting and/or other information of the overlaid obstacles can be updated based on the inertial data MVMT and the known range to the obstacles, and can thus be used by the pilot as reference points that would otherwise have been obscured by the DVE conditions.

Referring back to the example of FIG. 2, the image data $VID_{SA}$ and the inertial data MVMT are provided to a lucky region imaging component 62. The lucky region imaging component 62 is configured to enhance the frames of the image data $VID_{SA}$ with respect to environment-based occlusion of the FLIR video source 52 based on recursively processing the consecutive stabilized frames of the image data $VID_{SA}$ based on the inertial data MVMT. As an example, the environment-based occlusion of the FLIR video source 52 can be a result of the platform being in a DVE, such that the FLIR video source 52 can be occluded by sand (i.e., brownout), snow (i.e., whiteout), or a variety of other vision obscuring conditions. However, it is to be understood that the image processing system 56 may omit processing by the lucky region imaging component 62 in the absence of DVE conditions, such as for the moving platform (e.g., helicopter) flying in clear weather and/or too high to stir up dust clouds.

Figure 4:
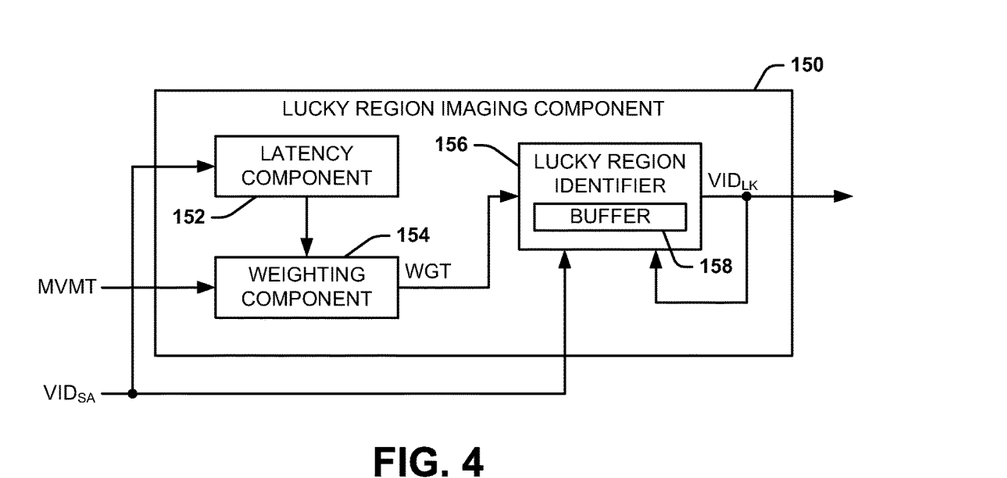
FIG. 4 illustrates an example of a lucky region imaging component.

FIG. 4 illustrates an example of a lucky region imaging component 150. The lucky region imaging component 150 can correspond to the lucky region imaging component 62 in the example of FIG. 2, and can thus be implemented in the image system 50 to enhance the frames of the image data $VID_{SA}$ with respect to environment-based occlusion of the FLIR video source 52. The lucky region imaging component 150 receives the inertial data MVMT and the image data $VID_{SA}$, which can correspond to the fourteen-bit IR image frames received at sixty fps, and which may include the SA data associated with the image data. The lucky region imaging component 150 outputs image data $VID_{LK}$, which can correspond to the enhanced image data $VID_{SA}$. In the example of FIG. 3, the lucky region imaging component 150 includes a weighting component 152, a latency component 154, and a lucky region identifier 156.

The lucky region imaging component 150 is configured to implement a recursive lucky region imaging algorithm to enhance the frames of the image data $VID_{SA}$. With the recursive algorithm, a revised current frame of image data is formed from its own pixel contents, as well as the pixel contents of a previously processed data frame (e.g., an immediately preceding processed image frame). The proportions of a current frame and a previously processed frame, at each frame time and at each pixel, can be computed based primarily upon the inertial data MVMT. The weighting component 152 receives the inertial data MVMT and applies weight values to the pixels of the current frame and the immediately preceding processed frame, wherein a sum of the weight applied to current frame and the weight applied to preceding frame at a given pixel location equals one (i.e., 1.0). In this manner, the recursive algorithm may only access the current frame and immediately preceding processed frame, which can be stored in the memory 18, thus minimizing storage requirements.

The weight values that are assigned by the weighting component 152 can vary across a given frame. The weight values are computed by the weighting component 152 for each new frame processed for each pixel therein. At each pixel location, for each frame processed, the corresponding weight is computed from an estimated optical flow for the pixel, which can be derived from the inertial data MVMT. For example, the optical flow value at each pixel can be computed as a function of the camera's roll, pitch, and yaw, velocity vectors, and/or an estimated range to the scene component associated with the given pixel of the frame. When the optical flow at a given pixel is high, the weight value can be raised to reduce blurring in the resultant processed image frame. As an example, the optical flow within the frame can be lowest at a focus-of-expansion point, which can also be the point in the frame corresponding to a direction where the moving platform is headed. The optical flow in the imagery can be highest toward the peripheral areas of the display, which can be the areas of the frame corresponding to a highest motion parallax. As an example, the optical flow for a given pixel (x,y) can be computed by the weighting component 152 as follows:

$$u(x,y)=(xV_z-fV_x)/z(x,y)+(xy\omega_x)/f+y\omega_z-\omega_y*(f+x^2/f) \quad \text{Equation 1}$$

$$v(x,y)=(yV_z-fV_y)/z(x,y)+(xy\omega_y)/f-x\omega_z+\omega_x*(f+y^2/f) \quad \text{Equation 2}$$

Where:
u(x,y) is the optical flow for the pixel (x,y) in the x direction;
v(x,y) is the optical flow for the pixel (x,y) in the y direction;
z(x,y) is an estimated range through the pixel (x,y) to a first scene intersection point;
f is a focal length of the FLIR video source 52;
($V_x$, $V_y$, $V_z$) corresponds to linear motion of the FLIR video source 52 as provided by the inertial data MVMT; and
($\omega_x$, $\omega_y$, $\omega_z$) corresponds to rotational motion of the FLIR video source 52 as provided by the inertial data MVMT.

Based on the optical flow for the given pixel (x,y), the weights can be calculated for the given pixel (x,y) as follows:

$$w_i(x,y)=\psi[u_i(x,y),v_i(x,y);\overline{L};\overline{w}_{i-1}\ldots\overline{w}_{i-n}] \quad \text{Equation 3}$$

Where:
i is a frame number;
w(x,y) is the weight that is applied to the pixel (x,y), where $0 \leq w_i \leq 1$;
$\overline{L}$ is a mean latency for the consecutive frames;
$\overline{w}_{i-1}\ldots\overline{w}_{i-n}$ are frame-averaged weights for n previous frames;
$\psi$ is a function that combines the input terms.

Equation 3 is but one manner in which the weights can be calculated by the weight component 152. As another example, the weight terms w(x,y) applied to each pixel (x,y) can be determined by an additional component related to the consistency of the imagery in a region about the pixel (x,y) in the current frame as compared to the same region in the previously processed preceding frame. In this example, an additional factor is applied based on the consistency of a gradient vector at the pixel (x,y) compared to the gradient vector at the preceding frame for the same pixel (x,y). For example, the weight component 152 can be configured to implement the following equation to calculate the weight w(x,y):

$$w_i(x,y)=\psi[u_i(x,y),v_i(x,y);\overline{L};\overline{w}_{i-1}\ldots\overline{w}_{i-n};((g_i(x,y)\cdot\overline{g}_{i-1}(x,y))/(\|g_i(x,y)\|\|\overline{g}_{i-1}(x,y)\|)] \quad \text{Equation 4}$$

Where:
$((g_i(x,y)\cdot\overline{g}_{i-1}(x,y))/(\|g_i(x,y)\|\|\overline{g}_{i-1}(x,y)\|)$ is a gradient vector (g) based luckiness measure.

The latency component 154 is configured to calculate the mean latency $\overline{L}$ associated with consecutive frames of the image data $VID_{SA}$. Latency can correspond to an average age of image data $VID_{SA}$ exiting the recursive algorithm relative to an age of a newest frame of image data $VID_{SA}$ entering the recursive algorithm. For example, the latency of the recursive algorithm can be defined as a function of the average age of the frames going into the recursive algorithm plus the time that it takes to process the frames. The average age of the processed frames can be directly determined by an average weight applied to a current frame of the image data $VID_{SA}$ when combined with the preceding just processed frame of the image data $VID_{SA}$. Lower latency can result when the weights applied to the current frame by the weight component 152 are increased. For example, higher latency can result when the weights applied to the current frame are reduced, and weights can be adjusted to maintain the mean latency $\overline{L}$ over short time intervals. As an example, during rapid motion of the moving platform, latency can be reduced through choice of weight values by the weight component 152, and during slow movement of the moving platform (e.g., a helicopter hovering), the latency can be increased through choice of weight values. This can be accomplished, for example, while maintaining a desired mean latency $\overline{L}$ on the order of tens of milliseconds (e.g., 33 milliseconds). A longer mean latency $\overline{L}$ can cause disorientation for piloting a moving platform based on the video images displayed by the video display system 24 being noticeably out of synchronization with observable real-time. However, too short a mean latency $\overline{L}$ can prevent the recursive lucky region imaging algorithm from operating effectively, thus only allowing single frame processing instead of the combining of information from consecutive frames. As an example, the mean latency $\overline{L}$ can be calculated as follows:

$$\overline{L}=P+\Delta T\sum_{n=0}^{-\infty}\alpha^{|n+1|}|n| \quad \text{Equation 5}$$

Where:
$\Delta T$ is equal to 1 divided by a frame rate (e.g., 16.5 milliseconds for sixty frames per second);
P is a processing time to reconstruct a new frame (e.g., 16 milliseconds);
n is a frame number, with n=0 corresponding to a current frame and larger numbers corresponding to older frames;
$\alpha$=a latency control parameter, which is set to 1.0 for no lucky imaging latency, but can be set to approximately 0.5 with lucky imaging latency.

The weights that are assigned to the pixels of the frames are provided to the lucky region identifier 156, demonstrated as via a signal WGT. The lucky region identifier 156 is configured to implement the recursive lucky region imaging process. As an example, the lucky region identifier 156 can be configured to implement the following equation:

$$\tilde{f}_i(x,y)=w_i(x,y)f_i(x,y)+[1-w_i(x,y)]\tilde{f}_{i-1}(x,y) \quad \text{Equation 6}$$

Where:
$\tilde{f}_i$ is a processed version of the current frame; and
$\tilde{f}_{i-1}$ is a processed version of the preceding frame.

As another example, the lucky region identifier 156 can be configured to implement the following equation, which can be a slightly more simplified version of Equation 6:

$$\bar{f}_i(x,y) = \alpha(x,y) f_i(x,y) + [1-\alpha(x,y)] \bar{f}_{i-1}(x,y), \text{ where } 0 \le \alpha \le 1 \quad \text{Equation 7}$$

As an example, the latency control parameter a can be set to approximately 0.5 to implement Equation 7. In the example of FIG. 4, the lucky region identifier 156 includes a buffer 158 configured to buffer a given processed frame of the image data $\text{VID}_{LK}$, such that it can be implemented as the preceding frame in a next calculation (i.e., to obtain the $\bar{f}_{i-1}$ term). In Equation 6, lower values of the weight term $w_i(x,y)$ at a pixel location (x,y) can correspond to spatially and temporally "luckier", and thus result in increased latency. The output of the lucky region identifier 156 thus corresponds to the enhanced image data $\text{VID}_{LK}$. As an example, through the processing of the lucky region imaging component 150, the output frame rate does not necessarily have to match the input frame rate, even if the recursive algorithm implemented by the lucky region identifier 156 is applied to each incoming frame of the image data $\text{VID}_{SA}$. For example, the input frame rate can be sixty frames per second, while the output frame rate can be thirty frames per second. As a result, the processing requirement of subsequent stages of the image processing system 56 can be reduced. However, based on the processing capability of the processor(s) 20 and/or the video display system 24, the frame rate can be the same at the input and the output of the lucky region imaging component 150.

As another example, if the horizontal pixel resolution of the FLIR video source 52 is greater than the horizontal pixel resolution of the video display system 24, or an available display area, only a portion of the image data $\text{VID}_{LK}$ may be mapped to the video display system 24, such as centered on a focus of expansion point. The focus of expansion point can be computed from the inertial data MVMT, for example, and can thus be based on motion of the moving platform. In addition, the lucky region imaging component 150 can be configured to add symbology data to the frames of the image data $\text{VID}_{LK}$. As one example, the focus of expansion point can be identified by the lucky region imaging component 150, such that it can be displayed on the video display system 24. Other examples of symbology data can include horizon, speed of the moving platform, or any of a variety of other types of identifiers to assist navigation of the moving platform (e.g., based on the Brown-Out Symbology System (BOSS) cues associated with the United States Air Force).

Referring back to the example of FIG. 2, the enhanced image data $\text{VID}_{LK}$ is provided to a wavelet enhancement component 64. The wavelet enhancement component 64 is configured to decompose the monochrome image data $\text{VID}_{LK}$ into high spatial frequency, middle spatial frequency, and low spatial frequency bands. In the example of FIG. 2, the respective spatial frequency bands are demonstrated as image data $\text{VID}_{WV}$. The image data $\text{VID}_{WV}$ is provided to a video processor 66 that is configured to convert the image data $\text{VID}_{WV}$ into data suitable for display as visible images, demonstrated as the visible video data IMG in the example of FIG. 2. For example, the video processor 66 can be configured to convert the respective high spatial frequency, middle spatial frequency, and low spatial frequency bands into an RGB color space, such that the visible video data IMG can be provided to the video display system 24 as color images. Accordingly, the pilot of the moving platform can use the enhanced visible images provided via the visible video data IMG to assist in navigating the moving platform.

As a result, the pilot or user of the artificial vision system 10 can implement the video display system 24 to assist in viewing a scene or navigating a moving platform in conditions of limited or no naked-eye visibility (e.g., DVE conditions).

Figure 5:
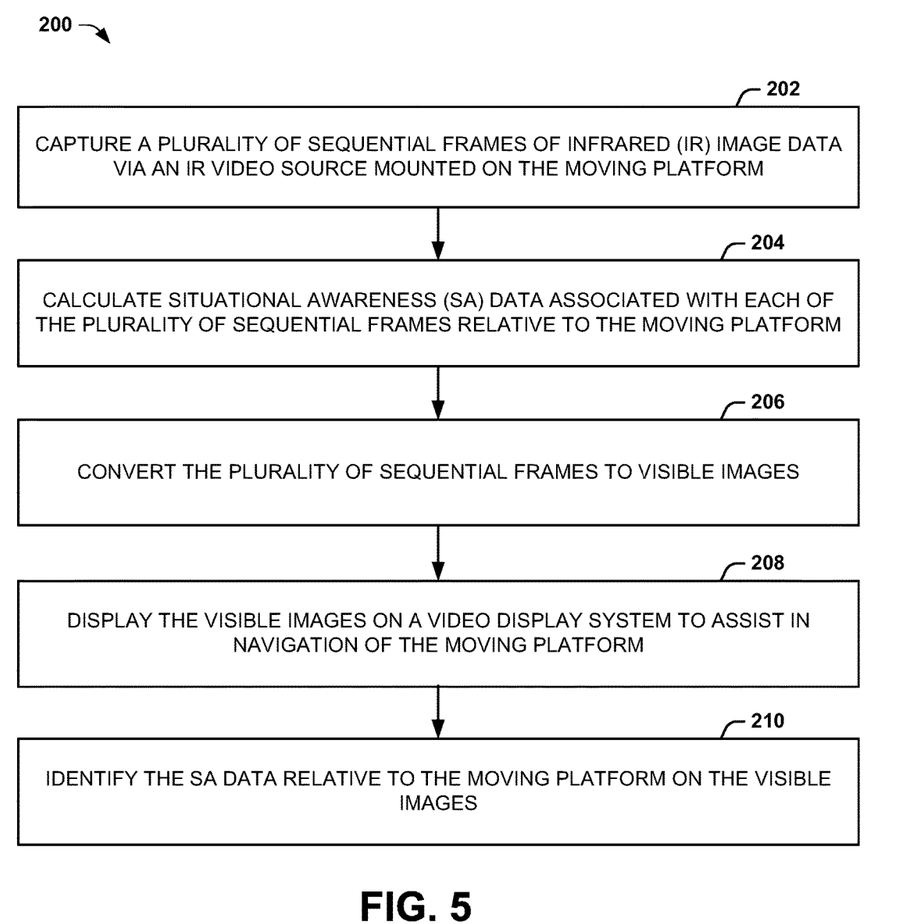
FIG. 5 illustrates an example of a method for providing artificial vision assistance for navigating a moving platform.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for providing artificial vision assistance for navigating a moving platform. At 202, a plurality of sequential frames of infrared (IR) image data (e.g., the image data $\text{VID}_{INIT}$) are captured via an IR video source (e.g., the FLIR video source 52) mounted on the moving platform. At 204, SA data associated with each of the plurality of sequential frames relative to the moving platform is calculated (e.g., via the synthetic vision SA component 60). At 206, the plurality of sequential frames are converted to visible images (e.g., the visible video data IMG). At 208, the visible images are displayed on a video display system (e.g., the video display system 24) to assist in navigation of the moving platform. At 210, the SA data relative to the moving platform is identified on the visible images.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An artificial vision system mounted on a moving platform, the system comprising:
    an image system comprising a video source to capture a plurality of sequential frames of image data and an image processing system to, via at least one processor, process the plurality of sequential frames to calculate situational awareness (SA) data with respect to each of the plurality of sequential frames based on inertial data and to convert the processed plurality of sequential frames to visible images and to process the plurality of sequential frames to calculate the SA data with respect to each of the plurality of sequential frames based on the inertial data associated with motion of the moving platform, wherein the image processing system further comprises a lucky region imaging component to enhance the plurality of sequential frames with respect to environment-based occlusion of the video source based on recursively processing the consecutive stabilized frames of the image data based on the inertial data and to assign a weight to each pixel associated with a current one of the plurality of sequential frames based on the inertial data and on a selected mean image latency, and wherein the lucky region imaging component further to apply a recursive imaging algorithm on the plurality of sequential frames based on the weight assigned to each pixel of the current one of the plurality of sequential frames and based on the image data associated with the current one of the plurality of sequential frames relative to an immediately preceding processed one of the plurality of sequential frames to enhance the plurality of sequential frames substantially continuously; and a video display system to display the visible images associated with the processed plurality of sequential frames and to visibly identify the SA data relative to the platform.

2. The system of claim 1, wherein the SA data comprises three-dimensional locations of obstacles with respect to the moving platform, wherein the image processing system comprises a synthetic vision SA component to generate a three-dimensional range map and to detect the obstacles on the three-dimensional range map based on parallax associated with consecutive stabilized frames of the image data and based on the inertial data.

3. The system of claim 2, wherein the image processing system further comprises a stabilization component to establish a homography between consecutive frames of the image data based on the inertial data to stabilize frame displacement between the plurality of sequential frames based on the homography to provide the consecutive stabilized frames.

4. The system of claim 2, wherein the synthetic vision SA component further to adjust data associated with the detected obstacles, such that the detected obstacles are highlighted on the displayed visible images separate from a respective background of the displayed visible images.

5. The system of claim 1, wherein the lucky region imaging component further to add symbology data to the plurality of sequential frames, the symbology data being overlayed onto the visible images on the video display system as at least a portion of the SA data.

6. The system of claim 1, wherein the lucky region imaging component further to calculate the weight assigned to each pixel based on computing an optical flow associated with a motion of each pixel associated with a current one of the plurality of sequential frames relative to at least one preceding sequential frame of the plurality of sequential frames.

7. The system of claim 1, wherein the video source is a forward-looking infrared (FUR) video source to capture the plurality of sequential frames as a plurality of sequential infrared (IR) frames, wherein the image system further to convert the plurality of sequential IR frames into the visible images.

8. The system of claim 6, wherein the image processing system comprises a wavelet enhancement component to convert the plurality of sequential IR frames into an RGB color space based on separate respective IR spatial frequency bands associated with each of the plurality of sequential IR frames.

9. A non-transitory computer readable medium to store instructions that, when executed by a processor, implement a method for providing artificial vision assistance for navigating a moving platform, the method comprising:

generating inertial data via an image system comprising an inertial measurement unit (IMU);

capturing a plurality of sequential frames of infrared (IR) image data via an IR video source mounted on the moving platform;

calculating situational awareness (SA) data associated with each of the plurality of sequential frames based on the inertial data and relative to the moving platform;

converting the plurality of sequential frames to visible images;

displaying the visible images on a video display system to assist in navigation of the moving platform;

identifying the SA data relative to the moving platform on the visible images; and recursively processing consecutive frames of the IR image data based on inertial data associated with the moving platform to enhance the plurality of sequential frames with respect to environment-based occlusion of the IR video source;

wherein recursively processing the consecutive frames comprises:

selecting a mean image latency with respect to the plurality of sequential frames based on the inertial data;

assigning a weight to each pixel associated with a current one of the plurality of sequential frames based on the inertial data and on the selected mean image latency; and applying a recursive imaging algorithm to the plurality of sequential frames based on the weight assigned to each pixel of the current one of the plurality of sequential frames and based on image data associated with the current one of the plurality of sequential images relative to an immediately preceding processed one of the plurality of sequential frames.

10. The medium of claim 9, wherein calculating the SA data comprises:

generate a three-dimensional range map based on parallax associated with consecutive frames of the plurality of sequential frames; and calculating three-dimensional locations of obstacles on the three-dimensional range map relative to the moving platform based on the parallax and based on inertial data associated with the moving platform.

11. The medium of claim 9, wherein identifying the SA data comprises overlaying symbology data onto the visible images on the video display system as at least a portion of the SA data, the symbology data being further arranged to assist in the navigation of the moving platform.

12. An artificial vision system mounted on a moving platform, the system comprising:

a self-enclosed image system comprising:

an infrared (IR) video source to capture a plurality of sequential frames of IR image data;

an inertial measurement unit to generate inertial data associated with the moving platform;

an image processing system via at least one processor and based on the inertial data to stabilize the plurality of sequential frames, to calculate situational awareness (SA) data with respect to each of the plurality of sequential frames based on the inertial data, to enhance the plurality of sequential images with respect to environment-based occlusion of the video source based on recursively processing consecutive stabilized images of the plurality of sequential frames, and to convert the plurality of sequential frames into visible images, the image processing system further comprising a lucky region imaging component to assign a weight to each pixel associated with a current one of the plurality of sequential images based on the inertial data and on a mean image latency, and wherein the lucky region imaging component further to apply a recursive imaging algorithm on the plurality of sequential images based on the weight assigned to each pixel of the current one of the plurality of sequential frames and based on image data associated with the current one of the plurality of sequential frames relative to an immediately preceding processed one of the plurality of sequential frames to enhance the plurality of sequential images; and a video display system configured to display the visible images and to visibly identify the SA data relative to the moving platform.

13. The system of claim 12, wherein the SA data comprises three-dimensional locations of obstacles with respect to the moving platform, wherein the image processing system comprises a synthetic vision SA component to generate a three-dimensional range map and to detect the obstacles on the three-dimensional range map based on parallax associated with consecutive stabilized images of the plurality of sequential frames based on the inertial data.

14. The system of claim 1, wherein the image system further comprises an inertial measurement unit (IMU) to generate the inertial data independently of an IMU associated with the moving platform.

* * * * *

UNITED STATES PATENT AND TRADEMARK OFFICE
CERTIFICATE OF CORRECTION

PATENT NO. : 9,970,766 B2
APPLICATION NO. : 14/041849
DATED : May 15, 2018
INVENTOR(S) : Dustin D. Baumgartner et al.

It is certified that error appears in the above-identified patent and that said Letters Patent is hereby corrected as shown below:

In the Claims

Column 11, Line 45 Claim 7, reads "(FUR)" should read --(FLIR)--

Column 13, Line 7 Claim 12, reads "system configured to display" should read --system to display--

Signed and Sealed this
Third Day of July, 2018

Andrei Iancu
*Director of the United States Patent and Trademark Office*